Dec. 25, 1945.   E. ORSHANSKY, JR   2,391,735
STEERING CONTROL MECHANISM FOR VEHICLES
Filed Nov. 13, 1941   2 Sheets-Sheet 1
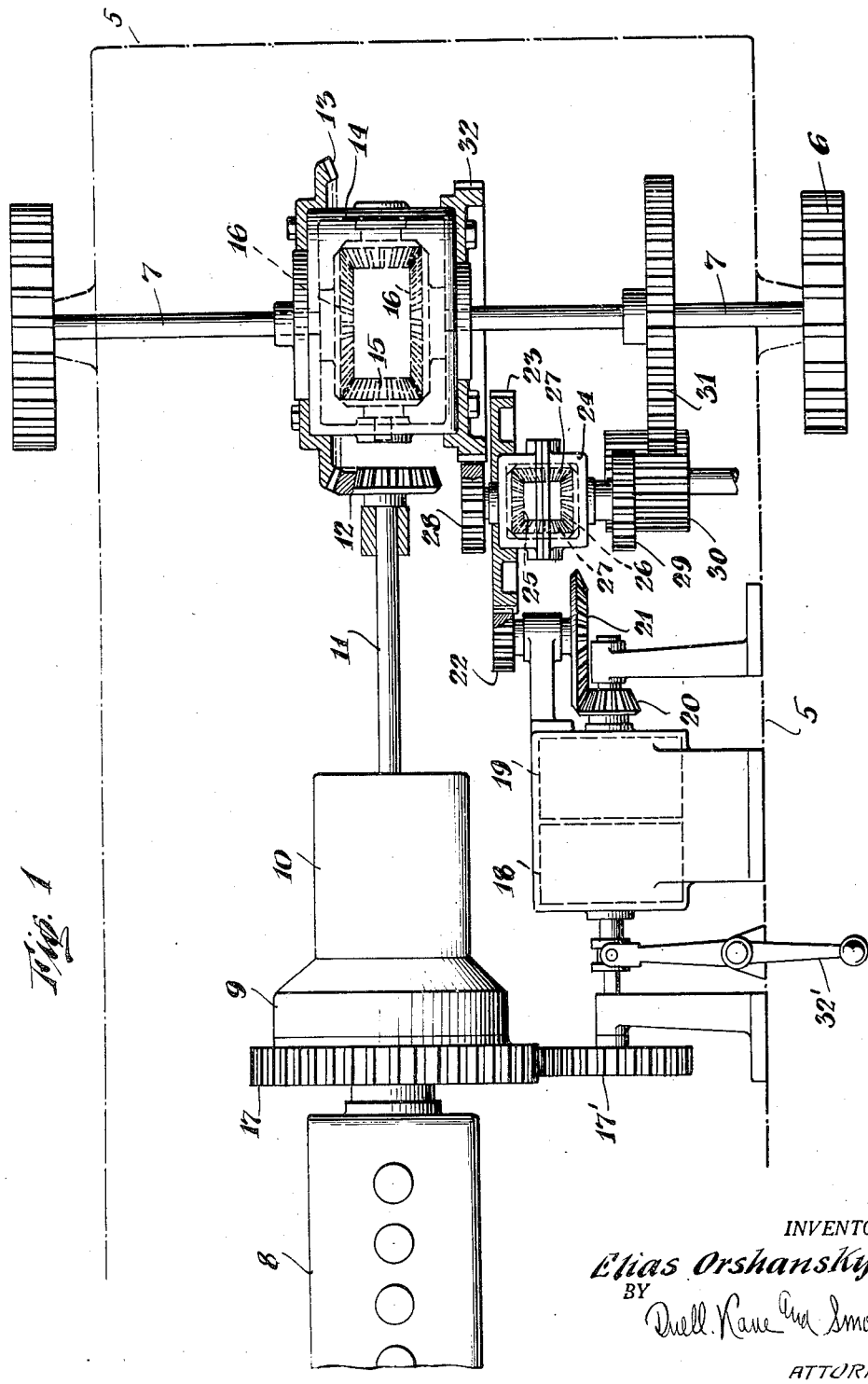
INVENTOR.
Elias Orshansky, Jr.
BY
Duell, Kane and Smoot
ATTORNEYS

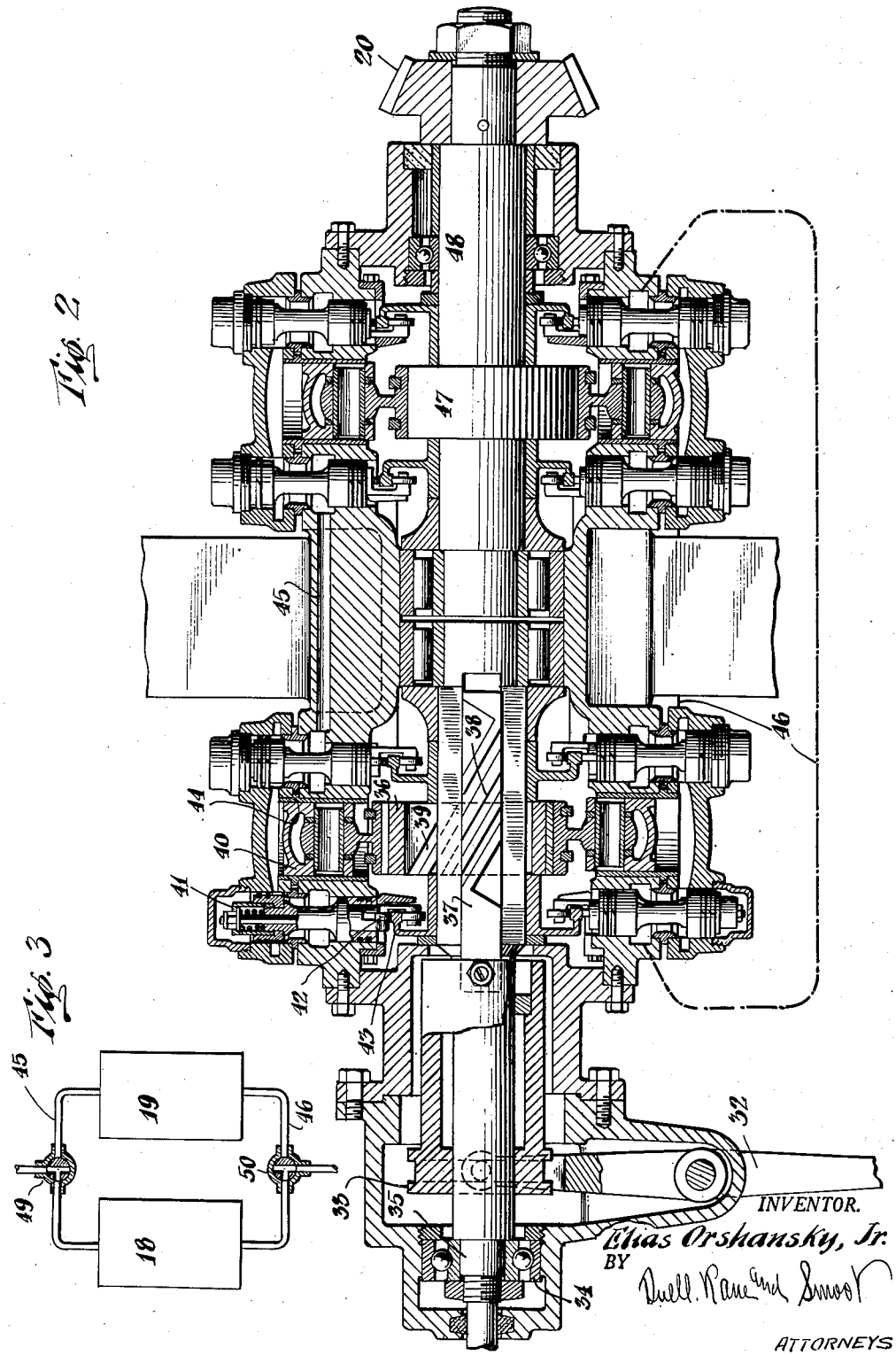

Patented Dec. 25, 1945

2,391,735

UNITED STATES PATENT OFFICE 2,391,735

STEERING CONTROL MECHANISM FOR VEHICLES

Elias Orshansky, Jr., Cleveland Heights, Ohio, assignor to The Acrotorque Company, Cleveland, Ohio, a corporation of Connecticut Application November 13, 1941, Serial No. 418,881

7 Claims. (Cl. 180—17)

This invention relates to a structurally improved control and in its more specific aspects aims to provide an apparatus of this nature of particular utility when employed in connection with the driving mechanism of a tractor or tank.

It is an object of the invention to furnish a mechanism of this character, which may be associated with any type of drive where a control of the present nature would have utility but which, when coupled to form a part of the operating mechanism of a vehicle such as a tank or tractor, will permit the latter to be steered and controlled with facility.

A further object of the invention resides in providing a control which, when utilized in the preferred association, will permit of the vehicle maintaining a straight or predetermined curved or irregular path with minimum attention or supervision by the operator or driver of the vehicle.

A still further object is that of furnishing a unit of this type, in which the steering or control of the vehicle will be accomplished without the loss of any useful power, in that any retarding influence exerted on the part of the drive mechanism by the present control will be regenerated in the form of power transmitted to another portion of the drive so as to supplement the power normally delivered to such latter portion.

An additional object is that of furnishing a mechanism of this type which will embody relatively few parts each individually simple and rugged in construction, these parts being capable of ready assembly to furnish a unitary apparatus occupying only a small amount of space; which apparatus will function over long periods of time with freedom from all difficulties.

With these and other objects in mind reference is had to the attached sheets of drawings illustrating one practical embodiment of the invention, in which:

Fig. 1 is a somewhat diagrammatic plan view of a vehicle such as a tractor or tank showing the improved control associated therewith;

Fig. 2 is a sectional plan view of the control unit per se and as embraced in Fig. 1; and Fig. 3 is a diagrammatic representation of the control unit in which control valves are disposed in the interconnecting fluid passages for disconnecting the motor and pump units from each other.

Referring primarily to Fig. 1, there has been shown, somewhat schematically, one arrangement of tank or tractor drive with the control of the present invention associated therewith. In such illustration, merely the simplest form of mechanism has been visualized; it being obvious to those skilled in the art that the general arrangement of the drive and the number of its parts might be varied in numerous respects according to the weight of the vehicle. Also, the control might be modified to conform to the particular drive mechanism which is involved. Accordingly, the present specification and drawings are to be regarded merely as an illustrative example rather than in a limiting sense.

Thus, in this view, the reference numeral 5 indicates the frame of the vehicle from which a pair of bull pinions 6 extend. The latter will ordinarily mesh with endless track members (not shown), the construction of which is well known and which serve to support and cause a movement of the vehicle over a surface. The pinions 6 are driven by shafts 7 by means of a more or less well known arrangement of driving mechanism.

One form which this mechanism may take will include as shown an engine 8 to the rear of which a clutch 9 is disposed. This clutch will connect with a transmission 10 providing any desirable number of forward speed ranges and also preferably a system of gearing such that a reverse driving may be effected. From the transmission, a driving or propeller shaft 11 extends. This may have a differential assembly coupled to it and including a pinion 12 which will mesh with a ring gear 13. The latter will be mounted to be fixed with respect to a cage 14 and such cage will mount pairs of differential pinions 15 and 16 the teeth of which mesh with each other. Secured to the pinions are the shafts 7.

The operation of a mechanism of this type is well understood in that with the propeller shaft 11 rotating, the cage 14 will be rotated. Under normal conditions of operation, such rotation will cause the pinions 15 to drive the pinions 16. This will, in turn, result in the shafts 7 being driven. In the event that one of the shafts and its attached bull pinion 6 tends to rotate at a faster rate than the other of the same—as would be the case if the vehicle were negotiating a curve—the differential mechanism will function to still transmit effective driving force to both of the shafts 7 while allowing for this relative movement of the parts.

In connection with vehicles of this type as heretofore constructed, it has been customary to associate with each of the shafts 7, or some connected portion of the mechanism, braking units by means of which an operator could selectively retard the motion of either of the shafts. Such retardation has, of course, resulted through the instrumentality of the differential mechanism in accelerating the second shaft as the rotation of one shaft has been retarded. In this manner, one tractor tread has had relatively accelerated movement with respect to the second tread. Accordingly, it has been feasible to steer the vehicle either to the left or right according to the selective energization of the braking structures. As is well understood by engineers and persons operating vehicles of this type, such braking actions have been achieved only by absorbing a greater or lesser amount of the power transmitted by propeller shaft 11 and converting the same into heat. In other words, power losses have occurred incident to heat dissipation by friction.

Thus, quite aside from the fact that the braking elements have required frequent renewal and have almost constantly needed adjustment, it is to be realized that steering controls as heretofore embodied in a tank or tractor have absorbed a large amount of the power available to driving the vehicle. Additionally, with such controls in perfect adjustment, it has been almost impossible for even a skilled operator to hold the vehicle to a predetermined path if any unevenness of ground was encountered. Also, such control is impracticable where the vehicle was negotiating an incline at an angle to the surface of such incline, or where the treads of the vehicle encountered different tractive conditions. This would be the case, for example, if one tread were passing through mud or over ice and snow while the other tread was engaging solid ground or rock. At best, under these circumstances, an operator has had to constantly manipulate the controls and has been able, with the exercise of utmost diligence, to only hold generally to a given course or path of travel.

As afore brought out, it is the intention of the present invention to provide a mechanism which will require only minimum manual supervision and control and which will have a long period of life aside from the fact that the operator, with virtually no attention to this mechanism, will be able to maintain the vehicle in a given path of travel. To effect this result, it is proposed to control the operations of the shafts 7, or their equivalents, in a manner such that, if the rotation of one of the shafts is to be relatively retarded, the power absorbed incident to effecting such retardation will be regenerated in the form of power transmitted to the other shaft. This result is secured by employing a hydraulic control unit which is coupled to the driving mechanism of the vehicle, for example, in the manner shown in Fig. 1.

Such coupling may be effected by securing to the shaft of the engine 8 a gear 17 which meshes with a gear 17' coupled to the input shaft of a pump unit generally indicated at 18. The construction of this pump unit as well as a motor unit 19 associated with the same will be hereinafter more particularly described with reference to Fig. 2. For the moment, however, disregarding such detailed construction, it will be noted that the casings of these units are fixedly secured to the frame 5 of the vehicle.

Extending from the motor unit is a shaft which mounts a pinion 20 serving to operate a secondary differential mechanism. In view of the fact that the pinion 20 will usually be rotating at a relatively high speed, when compared to the speed of rotation of the shafts 7, it is preferred to have this pinion drive a reduction gearing comprising, for example, a pinion 21 which rotates in synchronism with and drives a gear 22. The teeth of the latter mesh with the teeth of a gear 23. Such latter gear forms a fixed part of a cage 24. This cage forms a part of what might be termed the secondary differential mechanism.

As shown, the mechanism conveniently includes the pinions 25 and 26 rotatably mounted by the cage and the teeth of which mesh with bevel gears 27 which serve to interconnect all of the gears of this assembly. The gear 25 serves to drive a gear 28 while gear 26 is coupled against movement with respect to a gear 29.

Gear 28 meshes with the teeth of gear 32 secured to cage 14 of the main differential of the vehicle. Gear 29 meshes with a gear 30 meshing with the gear 31 secured to one of the shafts 7. As a consequence of the interposing of gear 30 between gears 29 and 31, it is obvious that with shafts 7 rotating at the same speed and in the same direction, the gears 28 and 29 will likewise rotate at speeds equal to each other but in opposite directions. It will also be obvious that the power transmitted by the gears 28 and 29 will be divided as a consequence of the gears 27 interposed between the gears 25 and 26 and all of which form a part of the secondary differential mechanism.

With a construction such as is contemplated in the present invention, such an operation of the parts would occur with the gear 23 and cage 24 stationary. This will be the case when the gears 20, 21 and 22 are likewise stationary. Under these circumstances, gear 32 would be driven incident to the rotation of gear 13 and cage 14 to rotate the gear 28. This would cause the latter to drive gear 25 to in turn drive gears 27. Such rotation of the parts would cause a corresponding rotation of gear 26 and gears 29, 30 and 31. Gears 31 and 32 being of equal diameter, it will be obvious, under these circumstances, that shafts 7 would be driven in synchronism regardless of the uneven conditions of traction encountered by the treads or equivalent tractive elements coupled to the same.

As will be hereinafter apparent, the pump unit 18 is of the type which may have its stroke or internal capacity varied from a point at which it discharges fluid under pressure through a given set of ports to a point at which the stroke of such pump is in effect non-existent and under which circumstances no fluid would be displaced by the pump unit. Moreover, further adjustment of the parts of the pump unit would cause the same to operate in a manner such that those ports which had heretofore acted as outlet ports would function as intake ports while the ports which had theretofore been functioning as intake ports would operate to permit the flow of high pressure discharge fluid.

As a consequence, the motor unit 19 which is preferably of fixed capacity will be rotated in either a clockwise or counter-clockwise direction. Assuming the pinion 20 to be rotating in a clockwise direction, that is, facing the pinion 20 side of the motor unit 19, it will be obvious that with the parts arranged in the manner shown, the gear 23 will be similarly rotated. This will cause a corresponding rotation of the cage 24. Such rotation—with the parts connected as shown— will cause the gear 28 to be relatively accelerated and the gear 29 to be relatively retarded. This will cause the shaft 7 which mounts the gear 31 to be relatively slowed down. Such control of the pump unit 18 may be effected by a simple manually operated control lever or element 32.

Conversely, it will be understood that if the control 32' is shifted to cause the motor unit 19 to drive the bevel gear 20 in a counter-clockwise direction, the gear 23 will—with the arrangement shown—rotate in a similar direction. Such rotation will necessarily result in the rotation of gear 28 being retarded with consequent retardation of the gear 32 and the cage 14. This will cause a relative acceleration of the gears 29, 30 and 31 to cause the shaft 7 affixed to the latter to be speeded up. In this manner, it will be seen that according to the operation of the control 32' either one of the bull pinions 6 or equivalent driving mechanism may be relatively speeded up with respect to the second one of the same. Conveniently, the overdrive may be varied from one extreme limit to the other through a three-to-one and one-to-three ratio.

Now, with a view to providing pump and motor units capable of achieving the foregoing results, attention is invited to Fig. 2, in which the control lever 32' has been shown as cooperating with a collar 33 which is rotatably mounted upon a shaft 35 supported by a bearing 34.

It is this shaft to which gear 17' or an equivalent driving element is secured. The shaft 35 rotates eccentric 36 which provides the crank of the pump unit. This eccentric may have its position varied by a reciprocation of the slide blocks or members 37 which are formed with grooves and ridges 38 for cooperation with corresponding grooves and ridges 39 in the eccentric. A shifting of the control 32' causes the reciprocation of the collar to correspondingly move the members 37. This will shift the eccentric from a position of maximum eccentricity to a position concentric with the shaft 35 and thence to a position of eccentricity equal to that which it initially occupied, but which position will be spaced 180° from such first position.

For reference to the details of the structure whereby such a shifting of the parts may be effected, attention is invited to my prior Patent 2,256,324, issued September 16, 1941. The precise structure disclosed in this grant varies in minor details from the embodiment illustrated herewith. It will suffice, however, for an understanding of the general structure and operation.

Pistons 40 are caused to be reciprocated by the eccentric 36 and the throw of these pistons will, of course, vary in accordance with the adjustment imparted to the eccentric. To either side of the pistons, valve assemblies 41 are disposed and which conveniently include pusher rods mounting anti-friction elements 42 for cooperation with cams 43. Thus, positive acting valves are furnished. While these valves may be of any desirable type, they are preferably of a structure such that a substantially leak-proof seal is furnished when they are in seated or closed positions. Each of the pistons 40 reciprocates in a cylinder 44 which forms a part of, or is integral with the general assembly including the spaces within which the valves are disposed.

Conveniently, the pump unit embraces five radially extending cylinders and pairs of valve assemblies and, with the timing of the latter fixed, it will be appreciated that one of each pair of valves will operate, for example, under a given adjustment of the eccentric to control the entrance of fluid into a given cylinder while the other of such pair will control the flow of liquid from such cylinder. This condition will maintain until the eccentric 36 has been adjusted to a position at which, in effect, no stroke of the pistons 40 occurs. When adjusted beyond this position, the valve which has heretofore served as an intake valve will function as an outlet valve and the valve which has heretofore functioned in the latter capacity will function as an inlet valve. All of these cylinders discharging into and receiving fluid from what, in effect, are manifolds common to the valves of any given series, it follows that if these manifolds are connected by passages such as 45 and 46 to the motor unit, the latter may be caused to rotate in a clockwise or counter-clockwise direction, so long as its eccentric or crank portion is not susceptible to adjustment in the manner heretofore described in connection with the pump.

As illustrated especially in Fig. 2, a fixed eccentric 47 forms a part of the shaft 48 which mounts the pinion 20. Therefore, it is obvious that the desired results will be achieved. Other than this difference, the construction of both the pump and motor units may be substantially identical.

As brought out in the diagrammatic illustration of Fig. 3, valves 49 and 50 may be interposed within the passages 45 and 46. By proper control of these valves, it will, of course, be feasible to disconnect the motor unit from the pump unit. Under these circumstances, the fluid circulated by the latter may be used for auxiliary purposes. These purposes may be manifold and include, for example, connection to a gun elevating and/or controlling mechanism associated with the vehicle in which the present invention is incorporated. Likewise, the liquid under pressure might be employed to actuate ram, or jack mechanisms which will serve to stabilize the vehicle in the event it is not to have movement imparted to it but rather is to function in the nature of a fixed gun-mount or station.

In any event and quite aside from the foregoing, it will be understood that as a consequence of having the pump unit preferably connected in advance of the transmission 10, the driving of such unit will be at a substantially constant rate of speed. Accordingly, the control of the vehicle may at all times be effected with great nicety. This would not be the case if the pump unit were connected to the rear of the transmission at which point it would be driven at a speed proportionate to the speed of rotation of the propeller shaft. It will also be obvious that, under these circumstances, it would be feasible to control the transmission 10 to, for example, drive the propeller shaft 11 at a low rate of speed while, at the same time, rotating the pinion 20 and the shaft 48 without decreasing the speed. Therefore, and particularly at low speed of vehicle movement and drive, the maneuverability of the vehicle will be especially great by means of the present control.

As will also be appreciated, when the pump unit is adjusted to be inoperative, no liquid will be circulated by this unit. This will be the case when the operator adjusts his control to what might be termed "neutral" position. Under these circumstances the pump unit provides a fixed reaction point for the motor unit regardless of the stresses on the drive shaft of the latter. Consequently, the gear train or equivalent structure connected to the motor unit will be inoperative. It follows that the movements of both shafts 7 will be controlled so that a forward driving of the vehicle occurs without constant manual supervision and adjustment to maintain the vehicle in a straight path.

Thus, among others, the several objects of the invention as specifically afore noted are achieved. Obviously, numerous changes in constructions and rearrangement of the parts might be resorted to without departing from the spirit of the invention as defined by the claims.

I claim:

1. A control for a drive including a motive source, a transmission operatively coupled thereto, and a pair of driven members connected to said transmission and adapted to be rotated at variable speeds thereby, a fluid pump unit operatively connected to said motive source in advance of said transmission, a motor unit operatively connected to said pump unit and to be driven thereby, a differential means connecting said motor unit with said driven members, and means for varying the capacity of at least one of said units to relatively retard one of the members and relatively accelerate the rotation of the other of the same.

2. A control for a drive including a motive source, a transmission operatively coupled thereto, and a pair of driven members connected to said transmission and adapted to be rotated at variable speeds thereby, a fluid pump unit operatively connected to said motive source in advance of said transmission, a motor unit operatively connected to said pump unit and to be driven thereby, a common differential means for connecting said motor unit with said driven members, means for varying the capacity and timing of at least one of said units, and means connected to said units for controlling the operation of the capacity-varying means and whereby, under one condition of control, one of said driven members will be relatively accelerated and the other of said members will be relatively retarded, and under another condition of control, said one of the members will be relatively retarded and said other relatively accelerated.

3. A control for a drive including a motive source, a transmission operatively coupled thereto, and a pair of driven members connected to said transmission and adapted to be rotated at variable speeds thereby, a fluid pump unit operatively connected to said motive source in advance of said transmission, a motor unit operatively connected to said pump unit and to be driven thereby, capacity-varying and timing means forming a part of at least one of said units, a differential means for connecting said motor unit with said driven members, and means connected to said pump and motor units for controlling the operation of the capacity-varying means and whereby, under one condition of control, one of said driven members will be relatively accelerated and the other of said members will be relatively retarded and under another condition of control, said one of the members will be relatively retarded and said other relatively accelerated and, under still another condition of control, said motor unit will be rendered substantially inoperative and the rotation of said driven members will be substantially synchronized.

4. A control for a drive having a driving element, a differential mechanism connected therewith and a pair of driven members coupled to said mechanism, a pump unit, a motor unit operatively connected to said pump unit to be driven thereby, a secondary differential mechanism connected to said motor unit, means coupling the elements of said secondary mechanism to said driven members, and means forming a part of at least one of said units to control the capacity and timing thereof and whereby such one unit may be rendered inoperative and optionally to cause said motor unit to rotate in either one of two different directions; said driven members under the former condition of the motor unit being substantially synchronized in their rotation and under the latter conditions of operation of said motor unit being relatively accelerated and retarded with respect to each other.

5. A control for a drive having a driving element, a differential mechanism connected therewith and a pair of driven members coupled to said mechanism, a pump unit, a motor unit operatively connected to said pump unit to be driven thereby, a secondary differential mechanism connected to said motor unit, means coupling the elements of said secondary mechanism to said driven members, means for controlling the capacity and timing of said pump and motor units to cause the latter to be rendered inoperative and optionally to cause said motor unit to rotate in either one of two different directions; said driven members under the former condition of the motor unit being substantially synchronized in their rotation and under the latter conditions of operation of said motor unit being relatively accelerated and retarded with respect to each other and means for operatively connecting said pump unit with the driving element of said drive.

6. A device for steering a motor vehicle by varying the relative speed of its driven members, comprising a source of power actuating a main driving shaft which propels the vehicle, a shaft for each driven member, differential gear mechanism intermediate said main driving shaft and said driven member shafts, a secondary differential having a cage and a pair of driven shafts, one of said secondary differential shafts having a drive connection to one of said driven member shafts, and the other of said secondary differential shafts having a drive connection through said first differential with the other of said driven member shafts, a fluid pump unit actuated by the main source of power, a fluid motor unit hydraulically connected with said pump unit, means for neutralizing said pump unit and for varying its capacity and for reversing the fluid flow between pump and motor units, a shaft driven by said motor unit, means connecting said motor unit shaft with the cage of the secondary differential, whereby rotation of the motor unit driven shaft rotates the secondary differential cage in one direction or the other depending upon the direction of fluid flow between pump and motor units and either of said driven member shafts may be accelerated in relation to the other driven member shaft.

7. A device for steering a motor vehicle by varying the relative speed of its driven members, comprising a source of power actuating a main driving shaft which propels the vehicle, a shaft for each driven member, differential gear mechanism intermediate said main driving shaft and said driven member shafts, a secondary differential intermediate said first differential and one of said driven shafts, both of said differentials having cages and said secondary differential having drive connections respectively to the cage of the first differential and said one driven shaft, a fluid pump unit actuated by the main source of power, a fluid motor unit hydraulically connected with said pump unit, a variable eccentric for neutralizing said pump unit and for varying its capacity and for reversing the fluid flow between pump and motor units, a shaft driven by said motor unit, means connecting said motor unit shaft with the secondary differential cage, whereby rotation of the motor unit driven shaft rotates the secondary differential cage in one direction or the other depending upon the direction of fluid flow between pump and motor units and either of said driven member shafts may be accelerated in relation to the other of said driven member shafts.

ELIAS ORSHANSKY, JR.